Figure 2:
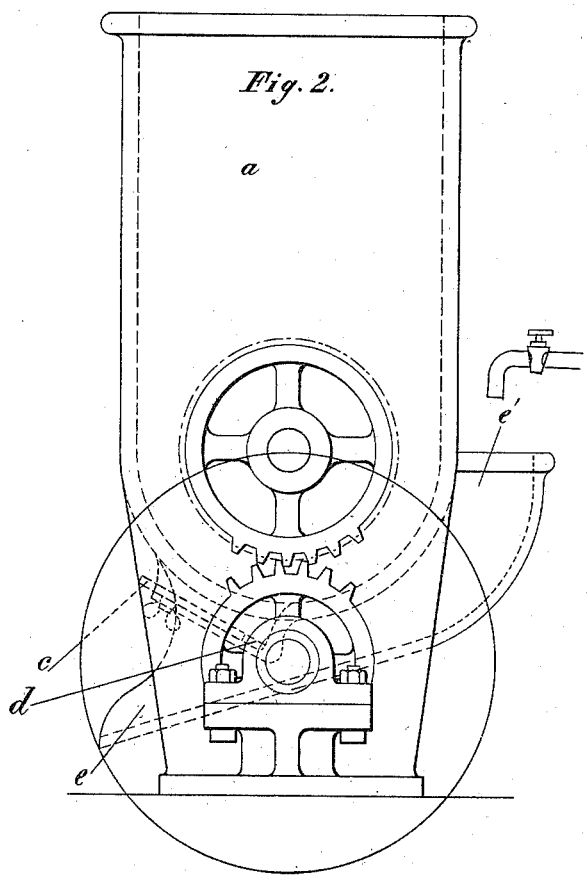

(No Model.) 6 Sheets—Sheet 1.
T. F. DOYER.
PROCESS OF AND MACHINE FOR HUSKING COFFEE.
No. 585,515. Patented June 29, 1897.
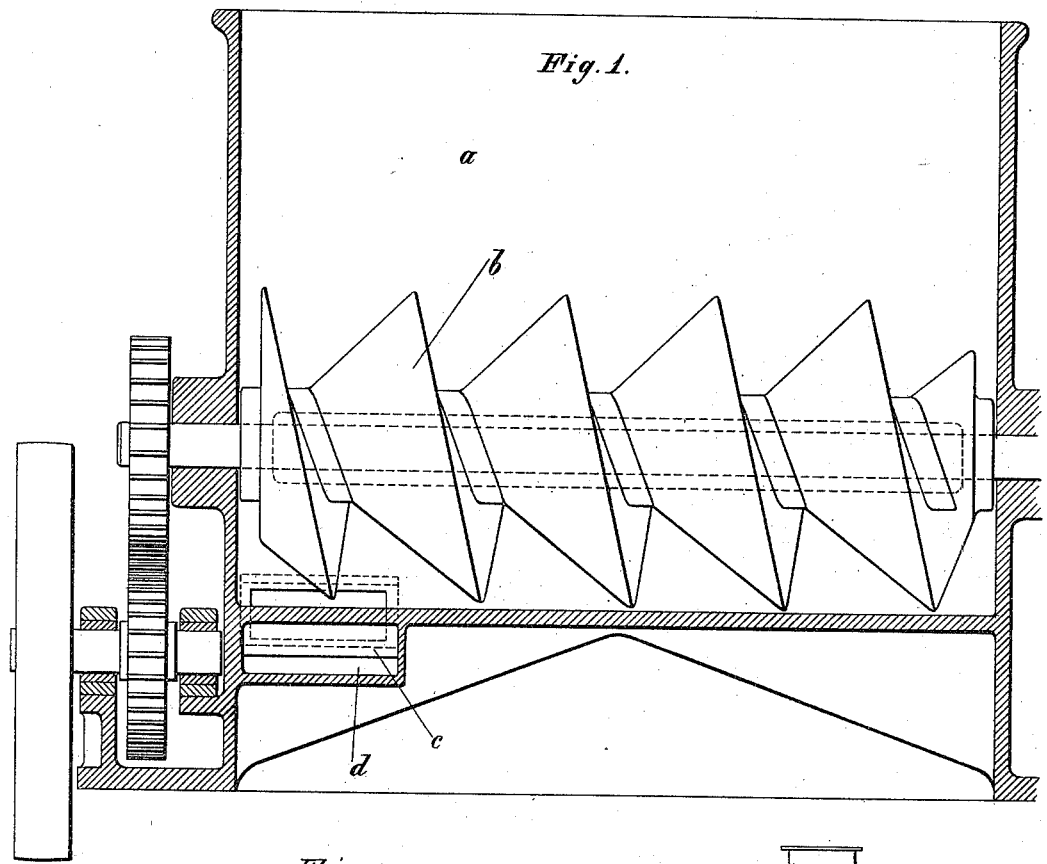
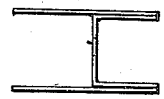
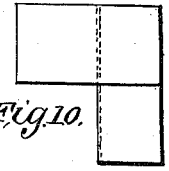
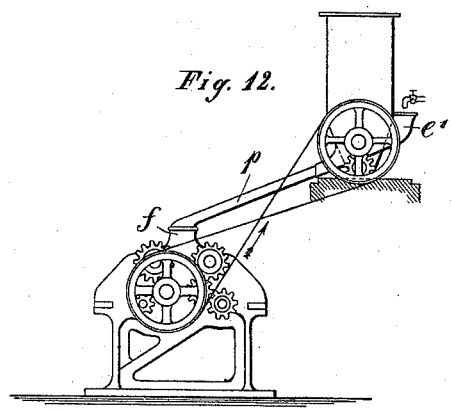
WITNESSES.
INVENTOR:
BY
ATTORNEYS.

(No Model.)  6 Sheets—Sheet 2.

T. F. DOYER.
PROCESS OF AND MACHINE FOR HUSKING COFFEE.

No. 585,515.  Patented June 29, 1897.

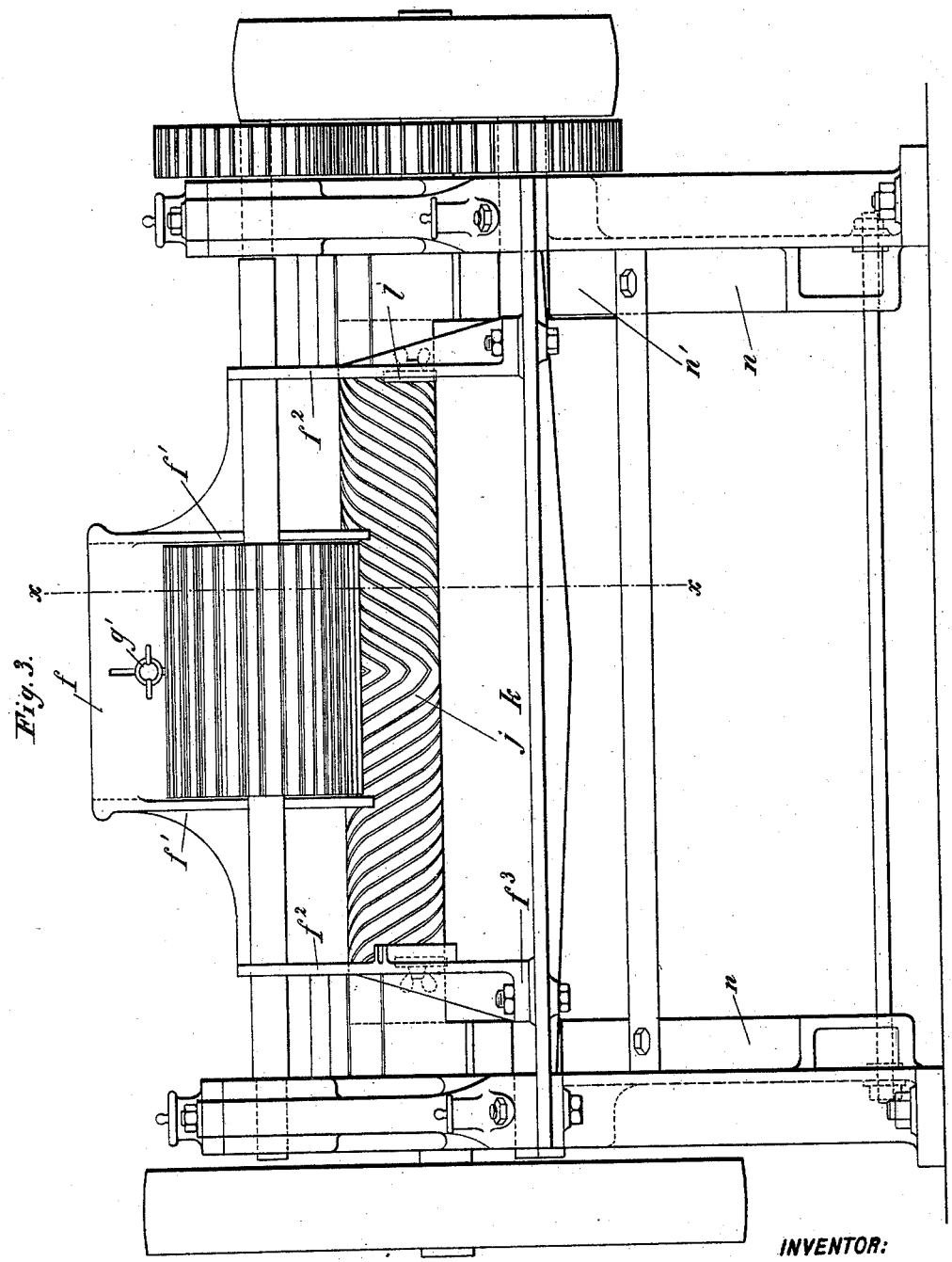

(No Model.) 6 Sheets—Sheet 4.
T. F. DOYER.
PROCESS OF AND MACHINE FOR HUSKING COFFEE.
No. 585,515. Patented June 29, 1897.
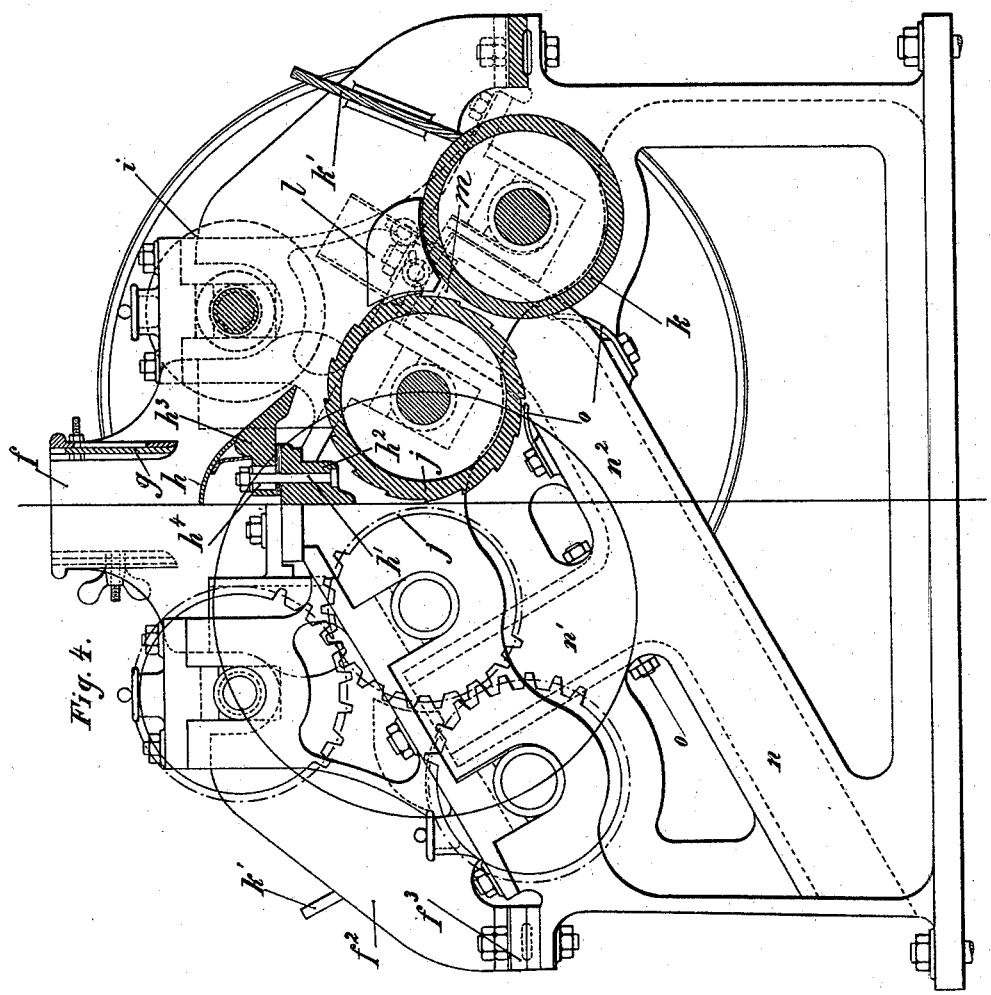
WITNESSES.
INVENTOR:

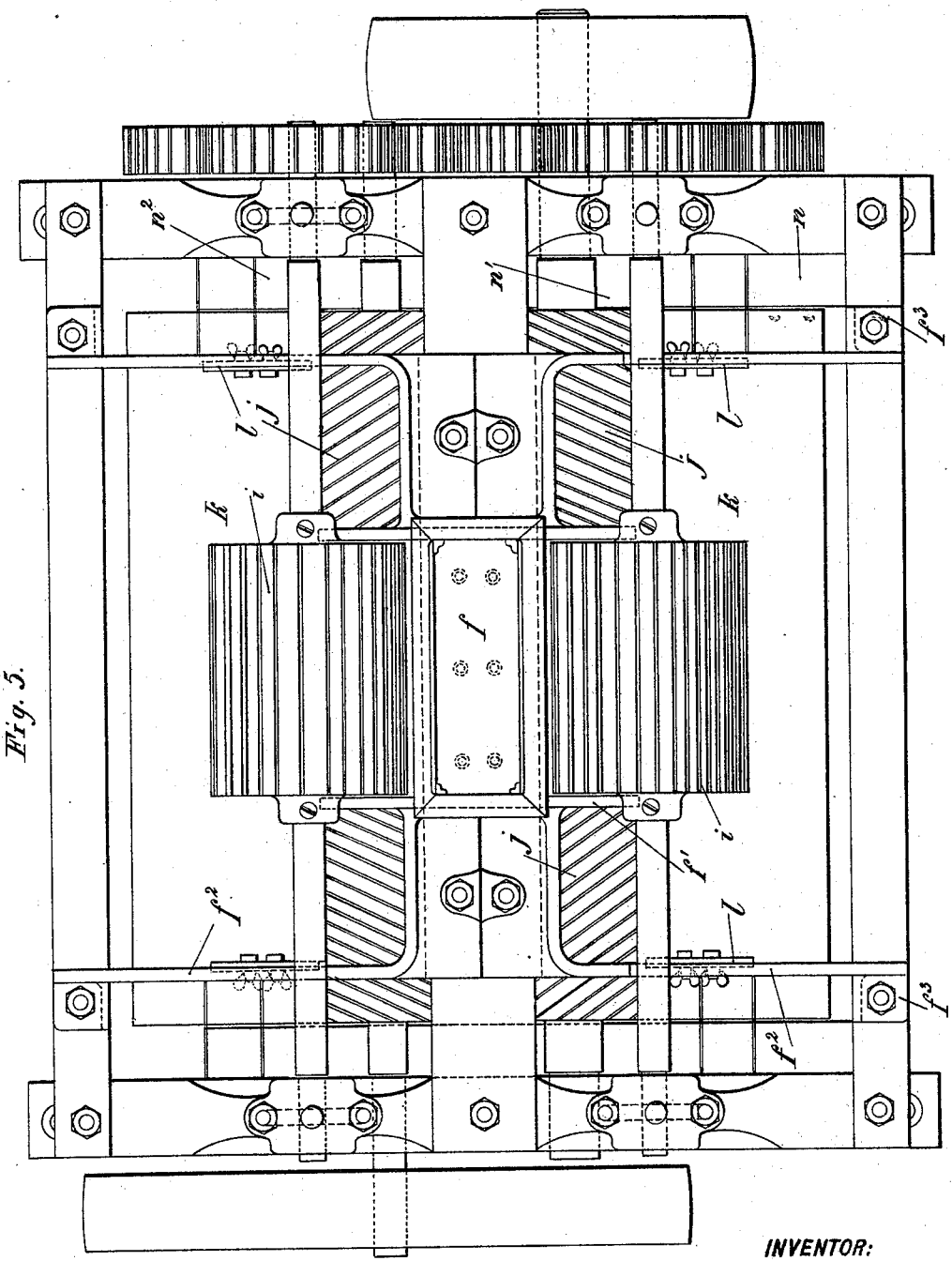

(No Model.) 6 Sheets—Sheet 6.
T. F. DOYER.
PROCESS OF AND MACHINE FOR HUSKING COFFEE.
No. 585,515. Patented June 29, 1897.
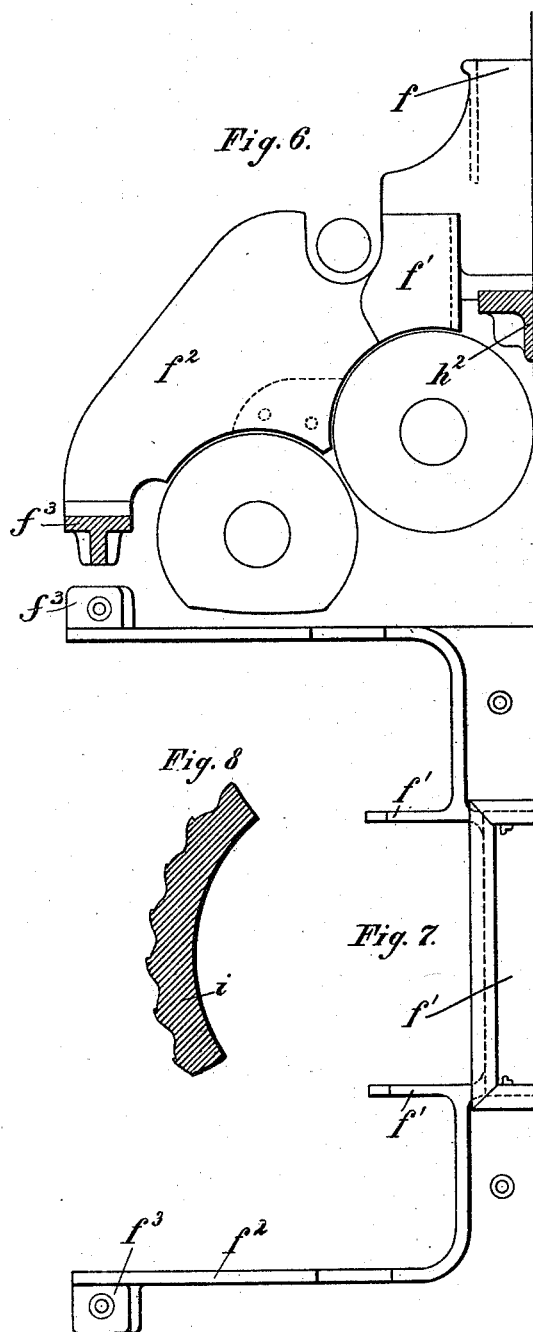
WITNESSES.
INVENTOR:
BY
ATTORNEYS

UNITED STATES PATENT OFFICE.

THOMAS FREDERIK DOYER, OF PASOEROEAN, JAVA.

PROCESS OF AND MACHINE FOR HUSKING COFFEE.

SPECIFICATION forming part of Letters Patent No. 585,515, dated June 29, 1897.

Application filed January 13, 1896. Serial No. 575,325. (No model.)

*To all whom it may concern:*

Be it known that I, THOMAS FREDERIK DOYER, a subject of the Queen of Holland, and a resident of Pasoeroean, in the Island of Java, have invented and produced a new and useful Machine for Husking Coffee, of which the following is a full, clear, and exact description.

My invention relates to machines for husking or hulling coffee-berries. It is well known that such berries comprise a red outer hull or body which is very tough and contains a high proportion of tannin and grains inclosed within the hull, each grain having a solid hard shell or cover.

In the preparation of coffee-berries the hull has to be removed from the grains, and this has to be done very thoroughly, as the tannin contained in the hull will have a detrimental influence on the flavor of the beverage prepared from the grains in case any part of the hull should still adhere to the grains. The complete separation of the hull, however, is very difficult, owing to the tenacity with which the hull adheres to the shell or cover of the grains, and hitherto the separation has been accomplished but imperfectly, with the result that the tannin of the hull was not thoroughly eliminated. It will be obvious that in removing the hull the inner cover of the grains should not be injured, and this requisite increases the difficulty of properly treating the berries, since according to their different degrees of maturity the connection of the hull with the cover of the grains is more or less strong.

The object of my invention is to obviate the above-indicated defects, and for this purpose I subject the berries before hulling them to a treatment whereby the hulls are loosened from the grains, so that they are in a better condition than heretofore for separation, the hulls being also rendered soft by said treatment.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1 is a longitudinal sectional elevation of that part of the machine in which the berries are subjected to pressure to effect the preparatory loosening of the hulls. Fig. 2 is a front view of said part. Fig. 3 is a front view of the hulling-machine proper. Fig. 4 is an end or side view thereof, one-half being shown in section on the line $xx$ of Fig. 3. Fig. 5 is a plan of the same. Figs. 6 and 7 are a side elevation and a plan, respectively, of the parts or castings forming the side walls of the inlet to the hulling-machine proper. Fig. 8 is a broken cross-sectional elevation of one of the hulling-rollers. Figs. 9, 10, and 11 are a front, side, and top view, respectively, of a funnel adapted to receive the cleaned grains; and Fig. 12 is a side elevation of the complete machine.

The mechanism for softening and loosening the hulls, as illustrated by Figs. 1 and 2, comprises a casing $a$, in which is mounted to rotate the screw $b$, which is intended to move and press the berries against each other and against the walls of the casing.

$d$ is the outlet, which may be closed by means of a sliding door $c$ and leads into a tubular discharge-spout $e$, Fig. 2. The said spout has an extension $e'$ at its upper end, said extension being adapted to receive water from any suitable source of supply to aid in conveying the berries to the hulling-machine proper through the connecting-tube $p$, Fig. 12.

The hulling-machine proper is preferably located at a lower level than the hull-loosening apparatus and has an inlet $f$ connected to the lower end of the tube $p$. As shown in Figs. 6 to 8, the inlet-chute $f$ is made integral with the side walls $f'$ and $f^2$, and flanges $f^3$ serve to fasten the casting $f\ f'\ f^2$ to the body of the machine by means of screws. At the inlet $f$ are arranged lateral vertically-adjustable slides $g$, adapted to be held in position by means of screws and winged nuts and serving to regulate the size of the passage or throat between said slides and the arched deflector $h$, located below the same, so that the width of said throat will be substantially equal to the size of the berries. The deflector has a roughened or corrugated surface and rests upon bars $h^3$, connected to the beam $h^2$ by means of screws $h'$. The bars $h^3$ are arranged longitudinally of the inlet $f$ and supported on the side walls $f'$, and longitudinal slots are formed in said bars to permit of adjusting the deflector $h$ toward and from the primary hulling-rollers $i$.

Beneath the deflector $h$ are located two conveying and hulling or finishing rollers $j$, each having screw-threads produced upon its surface, as shown best in Fig. 3, the screw-threads being of opposite pitch at each side of the roller's center. Adjacent to each of the rollers $j$ is located a smooth roller $k$, and dashboards $k'$ are disposed along the said rollers to prevent the berries from being thrown out by the primary hulling-roller $i$.

The outlet $m$ for the grains is formed between the rollers $j$ and $k$ and slides $l$, which are adjustably and removably set in the side walls $f^2$. The size of the outlet is so regulated as to correspond to the size of a grain with its shell, but separated from the hull. The main object of providing the slides $l$ is to enable this part of the machine, which is subjected to very strong wear by the constant rubbing of the hard shells, to be readily replaced.

Behind each aperture or outlet $m$ is located a funnel of the construction shown in Figs. 9, 10, and 11, each funnel being adapted to discharge the grains into a tubular chute $n\ n'$, the several chutes delivering the grains into a single tube $n^2$. The hulls pass downward between the rollers $j$ and $k$ and are mainly carried away by the water, such parts as stick to the rollers being removed by scrapers $o$.

The operation of the machine is as follows: The berries to be hulled are fed from above into the compressing or loosening apparatus and are gradually conveyed toward the outlet $d$ by the screw $b$. The hulls come into frictional engagement with each other as well as with the screw $b$, and the rotary or rolling motion as well as the pressure contribute to gradually loosen the hulls from the hard shells of the grains. The sliding door $c$ is opened by the attendant when the operation is completed, and more or less time is required for loosening the hulls, according to the condition of the berries. The berries are then conveyed with a stream of water into the hulling-machine proper, being first discharged upon the corrugated deflector $h$, which distributes them to each side toward the primary hulling-rollers $i$. The berries in passing between said deflector and rollers are torn open, the hull adhering but loosely to the grains. The berries then fall on the screw-threaded rollers $j$, the threads of which have a similar action to a screw conveyer and feed the grains away from the center of the rollers toward the discharge-openings $m$ at the ends thereof. The smooth rollers $k$ serve as a support for the grains. As the openings $m$ are of the exact size of the cleaned grains, it will be obvious that none of the hulls can pass through said openings. Thus only the grains with their smooth hard shells are discharged into the chute $n\ n'\ n^2$. The hulls, as hereinbefore stated, escape between the rollers $j$ and $k$.

The machine may be driven in any suitable manner—for instance, by means of belts and gear-wheels, as will be readily understood from the drawings and particularly Figs. 1, 4, and 12.

The main advantages of my invention are, first, the complete removal of the red hulls from the shells of the grains; second, the avoidance of all sieves and sorting or grading devices; third, the possibility of hulling the berries in such a manner that they are exposed to view during the whole operation.

Having thus described my invention, I claim as new and desire to secure by Letters Patent—

1. A machine for hulling coffee-berries and the like, comprising a frame having an inlet, primary hulling-rollers located at opposite sides of said inlet, a deflector located below the inlet, the central portion of the deflector being raised while its sides slant downward and are arranged adjacent to the said primary hulling-rollers so that the material will be crushed between the deflector and said hulling-rollers, finishing-rollers located below the deflector and arranged to receive the material after its passage between the primary hulling-rollers and the deflector, and supports on the outer sides of the finishing-rollers, to keep the material in engagement therewith, substantially as described.

2. The combination of the casing adapted to receive coffee-berries or the like and provided with an outlet, the revoluble screw within the casing, the hulling mechanism proper located at a lower level than the casing, and the tube or chute connecting the outlet of the casing to the inlet of the hulling mechanism, said tube having a water-inlet above its point of connection with the outlet of the casing, substantially as described.

3. An apparatus for hulling coffee-berries and the like, comprising primary hulling-rollers adapted to tear the hulls open, finishing-rollers having screw-threads to hull the berries and simultaneously convey them longitudinally of the rollers, and a support for holding the berries in contact with the rollers, substantially as described.

4. An apparatus for hulling coffee-berries and the like, comprising hulling-rollers having screw-threads to hull the berries and simultaneously convey them longitudinally of the rollers, and a support for holding the berries in contact with the rollers, the frame of the apparatus having at or near the ends of the rollers outlets of the size of the grains, to thoroughly separate the hulls therefrom, said outlets alining with the longitudinal spaces or pockets between the rollers and the support, substantially as described.

5. The combination of the frame having an inlet, the deflector opposed to the inlet, the primary hulling-rollers located adjacent to the deflector, so that the material will be crushed between said rollers and the deflector, and the finishing-rollers arranged to receive the material after its passage between the primary hulling-rollers and the deflector, substantially as described.

6. A machine for hulling coffee-berries and the like, comprising hulling-rollers having screw-threads of opposite directions, means for feeding the berries to the rollers at the portion where the opposite screw-threads meet, and a stationary support arranged adjacent to the lower portions of the hulling-rollers for holding the berries in contact with the rollers, substantially as described.

7. A machine for hulling coffee-berries and the like, comprising hulling-rollers, smooth rollers coöperating therewith, means for feeding the berries to the central portions of the hulling-rollers on that side which is nearest to the smooth rollers, means for conveying the berries longitudinally of the rollers toward the ends thereof, and discharge chutes or outlets for the grains at the ends of the rollers, while the hulls are allowed to escape between the rollers, substantially as described.

8. A machine for hulling coffee-berries and the like, comprising a frame having an inlet, a deflector opposed to the inlet, adjustable slides located at the sides of the inlet and movable toward and from the deflector to regulate the width of the passage or throat between the slides and deflector, primary hulling-rollers arranged in operative relation to the deflector, and finishing-rollers arranged to receive the berries after their passage between the deflector and primary hulling-rollers, substantially as described.

In witness whereof I hereunto set my hand in presence of two witnesses.

THOMAS FREDERIK DOYER.

Witnesses:
PEREGRINE VARNAL,
KATE STYLES.